(12) United States Patent
Jeuk et al.

(10) Patent No.: US 10,652,155 B2
(45) Date of Patent: *May 12, 2020

(54) UNIVERSAL CLOUD CLASSIFICATION [UCC] AS A SERVICE

(71) Applicant: Cisco Technology, Inc., San Jose, CA (US)

(72) Inventors: Sebastian Jeuk, Munich (DE); Gonzalo Salgueiro, Raleigh, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/384,464

(22) Filed: Apr. 15, 2019

(65) Prior Publication Data

US 2019/0245791 A1   Aug. 8, 2019

Related U.S. Application Data

(63) Continuation of application No. 15/215,499, filed on Jul. 20, 2016, now Pat. No. 10,263,898.

(51) Int. Cl.
*H04L 12/14* (2006.01)
*H04L 12/813* (2013.01)
*H04L 12/851* (2013.01)
*H04L 12/859* (2013.01)
*H04L 12/24* (2006.01)

(52) U.S. Cl.
CPC ......... *H04L 47/20* (2013.01); *H04L 41/5051* (2013.01); *H04L 47/2441* (2013.01); *H04L 47/2475* (2013.01)

(58) Field of Classification Search
CPC . H04L 47/20; H04L 47/2441; H04L 47/2475; H04L 41/5051
See application file for complete search history.

(56) References Cited

U.S. PATENT DOCUMENTS

| 8,880,678 | B1 * | 11/2014 | Colton | G06F 9/5072 709/203 |
|---|---|---|---|---|
| 9,143,612 | B2 | 9/2015 | Roncoroni | |
| 2013/0125124 | A1 | 5/2013 | Kempf | |
| 2014/0075501 | A1 | 3/2014 | Srinivasan | |
| 2014/0090037 | A1 * | 3/2014 | Singh | H04L 63/0815 726/7 |
| 2014/0101299 | A1 * | 4/2014 | Cherel | G06F 9/468 709/223 |
| 2014/0169215 | A1 | 6/2014 | Rajendran | |
| 2015/0052247 | A1 | 2/2015 | Threefoot | |

(Continued)

*Primary Examiner* — Chi H Pham
*Assistant Examiner* — Fahmida S Chowdhury
(74) *Attorney, Agent, or Firm* — Polsinelli PC (57) ABSTRACT

Disclosed is a system and method of providing transport-level identification and isolation of container traffic. The method includes assigning, by a software-defined-network (SDN) controller in an SDN-enable cloud environment, a service-ID to a service, a tenant-ID to a tenant and/or workload-ID to yield universal cloud classification details, and extracting, from a data flow, the universal cloud classification details. The method includes receiving a policy, generating flow rules based on the policy and universal cloud classification details, and transmitting the flow rules to an openflow application to confine packet forwarding decisions for the data flow.

20 Claims, 3 Drawing Sheets

(56) References Cited

U.S. PATENT DOCUMENTS

| | | | |
|---|---|---|---|
| 2015/0227405 A1* | 8/2015 | Jan | G06F 11/079 |
| | | | 714/37 |
| 2015/0227406 A1 | 8/2015 | Jan | |
| 2016/0050141 A1* | 2/2016 | Wu | H04L 41/5054 |
| | | | 370/389 |
| 2016/0057291 A1* | 2/2016 | Iyer | G06Q 10/00 |
| | | | 455/406 |
| 2016/0277368 A1 | 9/2016 | Narayanaswamy | |
| 2016/0283273 A1* | 9/2016 | Li | G06F 9/5011 |
| 2017/0300359 A1* | 10/2017 | Kollur | G06F 9/5022 |

* cited by examiner

UNIVERSAL CLOUD CLASSIFICATION [UCC] AS A SERVICE

CROSS-REFERENCE TO RELATED APPLICATIONS

This application is a continuation of U.S. application Ser. No. 15/215,499 (issued as U.S. Pat. No. 10,263,898), filed on Jul. 20, 2016, the content of which is incorporated herein by reference in its entirety.

TECHNICAL FIELD

The present disclosure provide for universal cloud classification (UCC) "as a Service" as a way to make the cloud-ID available to the provider, tenants and applications in a cloud environment. While being transmitted on the network layer, the IDs are accessible by application programming interfaces (APIs) through the UCCaaS application. Direct access to these IDs providers, tenants and applications enables policy enforcement.

BACKGROUND

Universal Cloud Classification (UCC) is a tiered/hierarchical model used to incorporate Cloud-ID natively in the transport layer. It enables segmentation and classification of traffic based on cloud entities such as Cloud providers, services and tenants. The implementation approach of UCC thus far has been 'default on', meaning that UCC is either enabled or disabled for the entire environment. There is currently no way to enable and disable UCC on-demand as well as dynamically enable it on a per-tenant basis.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

The present disclosure addresses the above-identified issues. The UCC introduced above incorporates a cloud-ID, tenant-ID, and service-ID into the layer 3 of the network so that network entities in an environment or across different environments can use these IDs to perform policy enforcement. It is difficult to manage policies at scale. With the UCC visibility into the network layer, one can apply policies with less overhead processes. The UCC information provides visibility into the network, the services and tenants. The IDs can be used to apply policies against tenants, services, and cloud providers. The present disclosure extends and applies the use of these various IDs, and introduces a new workload-ID, through a UCC as a Service (USSaaS) component.

The present disclosure provides a solution which enables a means of using the UCC for tenants of cloud services to leverage the advantages of the UCC for their individual needs. In order to implement the UCCaaS to interoperate with the UCC and their IDs, the system needs some kind of entry point into the cloud environment in order to be able to access the IDs, define policies, and implement policies. The UCCaaS provides this entry point and functionality to enhance the benefits of the UCC. The disclosure uses UCC to support both north- and south-bound APIs for tenants, providers and applications leveraging the defined IDs.

This disclosure includes systems, methods and computer-readable storage devices which implement the concept disclosed herein. In one example, the method includes assigning, by a software-defined-network (SDN) controller in an SDN-enable cloud environment, a service-ID to a service and a tenant-ID to a tenant to yield universal cloud classification details, and extracting, from a data flow, the universal cloud classification details. The method includes receiving a policy, generating flow rules based on the policy and universal cloud classification details, and transmitting the flow rules to an openflow application to confine packet forwarding decisions for the data flow.

The UCCaaS can provide APIs to enable calls to request the assignment of a service-ID and a tenant-ID from a service like Keystone. OpenStack Identity (known as Keystone) provides a central directory of users mapped to the OpenStack services they can access. It acts as a common authentication system across the cloud operating system and can integrate with existing backend directory services like the lightweight directory access protocol (LDAP). It supports multiple forms of authentication including standard username and password credentials, token-based systems and AWS-style (i.e., AMAZON WEB SERVICES) logins. Additionally, the catalog provides a queryable list of all of the services deployed in a cloud (e.g., OPENSTACK) in a single registry. Users and third-party tools can programmatically determine which resources they can access. In the present disclosure, Keystone (or a similar service) can communicate through APIs to a central registrar or entity to perform one or more of assigning, defining, generating, managing, maintaining, updating, deleting, etc. the IDs.

The UCCaaS can then extract the IDs, access a database that stores the IDs and associated policies (on a per-service, per-tenant or even per-workload basis). The UCCaaS can then use the policies to define flow rules that are then delivered via an API to an OpenFlow Application and hardware/software switches for managing data flow.

DESCRIPTION

When a person wants to define a network, she must rely on various protocols which have been defined for environments where the cloud was not envisioned at the time. There are limitations in terms of scalability, but none of them have in the context of the cloud. Conventional classification is typically based on Internet Protocol (IP) prefixes or addresses, protocol numbers identifying, for example, TCP or UDP, TCP/UDP port numbers and higher layer identities. These isolation techniques are used to identify individual endpoints and applications hosted. However, in cloud computing, providers host many different services on top of the same UDP/TCP ports, the same range of public IP addresses across many endpoints. There is currently no service-awareness in networks, which is critical to properly isolate providers, theirs services and tenants.

These challenges magnify in the case of running services across multiple clouds (InterCloud use-case). Classification becomes even more critical with multi-tenancy and tenant/ service mobility across clouds. Traffic between cloud environments needs to be affiliated to its originating cloud provider and services.

With the introduction of cloud computing, ways to adapt network IDs to the virtualized, dynamic and agile infrastructure of a cloud environment have been tried. In legacy networks, matching traffic against their VLAN, IP or port affiliation often has been granular enough to accurately define business related policies. However, with cloud computing, simply relying on VLANs, IP addresses or port numbers as classification mechanisms, is not sufficient. Classifying traffic based on network IDs requires deep-packet-inspection. This typically results in high latency for the tenant.

Virtual Extensible Local Area Networks (VxLANs) have been introduced recently to circumvent the limitations providers faced using VLANs. VxLAN now offers a 24-bit network segmentation ID. Even though it might address the scale limitations of VLANs, it still lacks the cloud computing specific classification and separation of providers, services and tenants.

A hierarchical end-to-end classification scheme is used in cloud computing. The classification scheme includes a cloud-identifier (ID), a service-ID, a tenant-ID, and/or a workload-ID to identify a cloud provider, a service provided by the cloud provider, a tenant that uses the service, and/or a workload or subpart of a workload from the tenant. The cloud-ID is usually assigned once when a user registers a cloud environment. In a cloud computing environment, conventional techniques do not allow classification and isolation on a per-cloud/-service and -tenant basis on the network layer. Multi-tenancy is an important aspect of cloud computing; however, the conventional techniques to define multi-tenancy in the networks are not sufficient for cloud environments.

The present disclosure provides a new approach to enable and disable the UCC on-demand as well as enable it on a per-tenant, per-service or even on a per-workload or sub-workload basis. The disclosure first shall discuss basic computer hardware components and then shall address more specifically the UCCaaS model.

Figure 1:
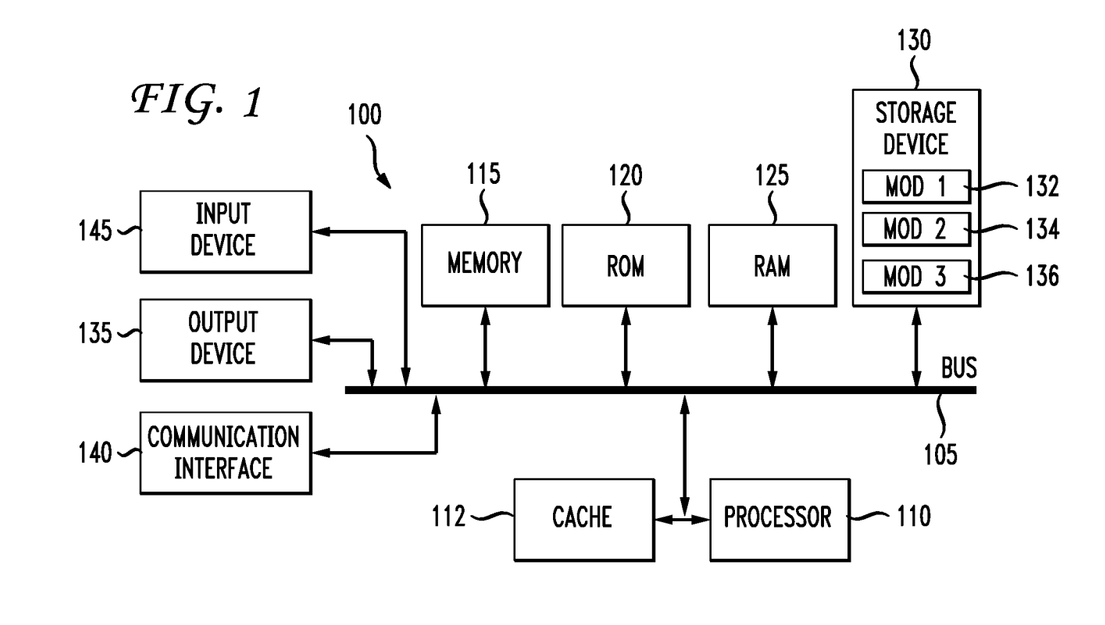
FIG. 1 illustrates the basic computing components of a computing device according to an aspect of this disclosure.

FIG. 1 discloses some basic hardware components that can apply to system examples of the present disclosure. Following the discussion of the basic example hardware components, the disclosure will turn to the UCCaaS approach. With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide non-volatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device such as a display 135, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

Figure 2:
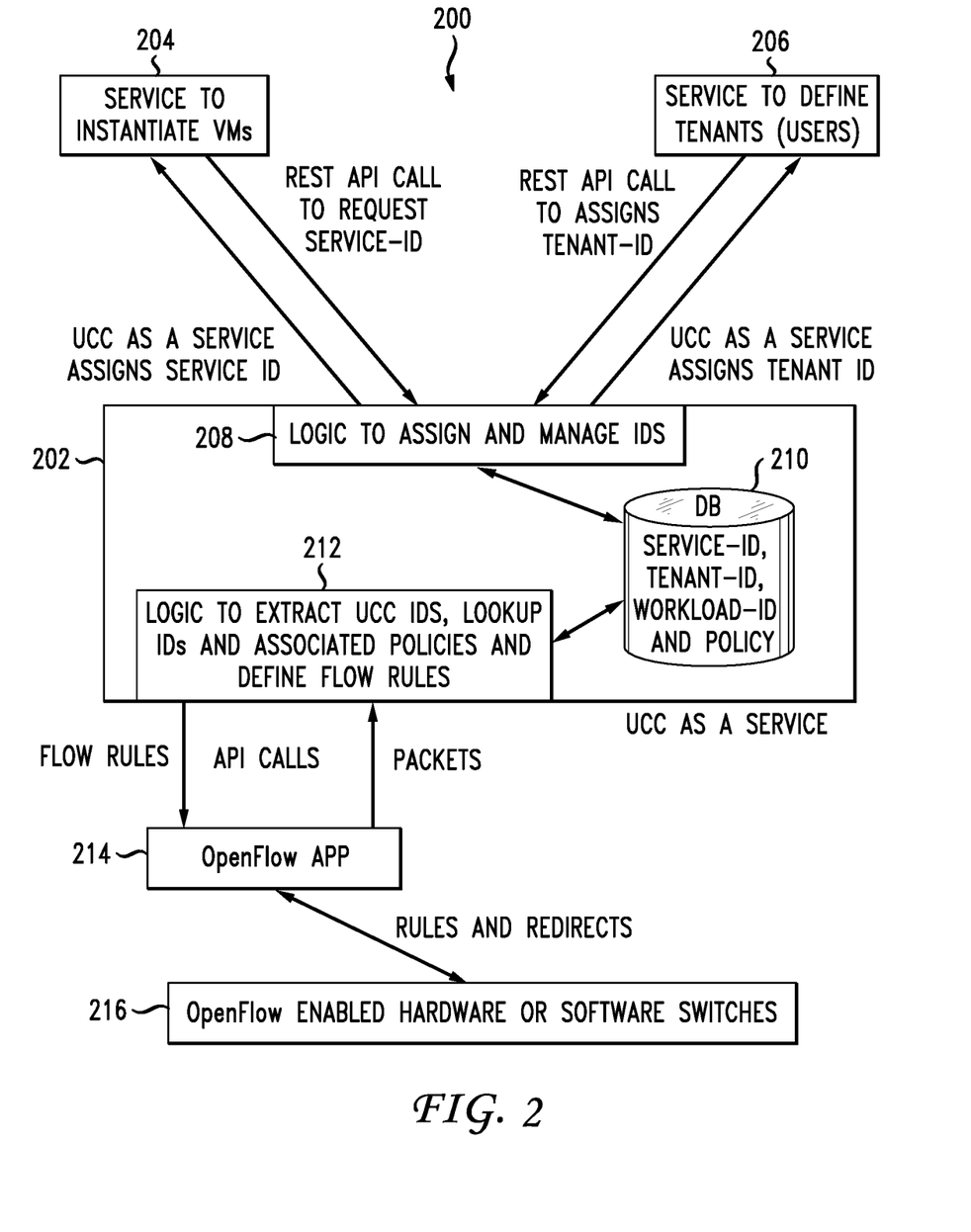
FIG. 2 illustrates the general context in which the present disclosure applies.

The disclosure now turns to FIG. 2, which illustrates an example environment 200 for UCC as a service. The present inventors disclose a novel approach to dynamically and on-demand leverage the UCC cloud-IDs. This leverage is enabled through a service model for the UCC. This service model will be integrated into a cloud environment enabling tenants to dynamically leverage UCC in their environments.

The following provides an example of a structure for a cloud-ID (C-ID), service-IDs (S-IDs), and tenant-IDs (T-IDs): Cloud provider 1 is assigned cloud-ID 12:12:12:12; Cloud services 1 and 2 are assigned S-IDs ab:ab:ab:ab:ab:ab and 34:34:34:34:34:34, respectively; Tenant 1 is assigned T-IDs cd:cd:cd:cd:cd:cd and 56:56:56:56:56:56 for cloud service 1 and 2, respectively; and Tenant 2 is assigned T-IDs 78:78:78:78:78:78 and 78:78:78:78:78:78 (i.e., the same T-ID) for cloud services 1 and 2, respectively.

These or other structures of the various ID's can be utilized in the present disclosure. A similar ID structure can also be applied to workload or a subcomponent of the workload.

As shown in FIG. 2, the UCC as a Service (UCCaaS) 202 application is aware of the IDs defined within a cloud environment for the services 204 and the tenants 206. Based on the UCC classification details it gathers from the flows 212, it pushes flow rules to the OpenFlow forwarder 214 to configure forwarding decisions 216.

The concept of "UCC as a Service" is introduced as a module 202 in a software-defined network (SDN)-enabled cloud environments (e.g., OpenDaylight, VTS, etc.) 200 to leverage the UCC IDs. Instead of relying on every device within the environment to inspect and understand the UCC information, the UCCaaS 202 moves this logic out to an SDN controller. As an additional application (App) offering south- and north-bound APIs, the UCCaaS 202 taps into already existing infrastructure applications used to define forwarding rules. In addition, the UCCaaS 202 leverages the UCC IDs incorporated into the IPv6 extension headers (or other headers or data fields in a packet), defines forwarding decisions on internal rules (which can be obtained from a database 210) and pushes these out to the OpenFlow Application 214 using the standardized 5-tuple flow rules. Other structures can be used as well to pass the flow rules through the API. The logic around the UCC can be enabled or disabled by simply adding another application to an SDN controller. The flow rules, defined by using the 5-tuple classification or in another manner, can be defined without direct understanding of UCC ID's on the hardware and/or software switches.

The application 202 of FIG. 2 offers a north-bound and a south-bound API interface shown as "API Calls" between the UCCaaS 202 and the OpenFlow Application 214, as API Calls between the UCCaaS 202 and the various services to instantiate virtual machines 204 and to the service to define tenants 206. The north-bound interface is used both the handle service-ID assignment 204 and tenant-ID assignment 206 and lifecycle management. A cloud orchestration tool can directly interact with the UCCaaS application 202 to request tenant-IDs and service-IDs when spinning up or creating applications or tenants respectively. The south-bound API on the other hand allows other applications, the provider or the tenant to interact with UCCaaS 202 to query IDs and their associated tenant, service information.

The UCCaaS can provide APIs to enable calls to request the assignment of a service-ID and a tenant-ID from a service (204, 206) like OpenStack Identity. OpenStack Identity (known as Keystone) provides a central directory of users mapped to the OpenStack services they can access. It acts as a common authentication system across the cloud operating system and can integrate with existing backend directory services like LDAP. It supports multiple forms of authentication including standard username and password credentials, token-based systems and AWS-style (i.e. Amazon Web Services) logins. Additionally, the catalog provides a queryable list of all of the services deployed in an OpenStack cloud in a single registry. Users and third-party tools can programmatically determine which resources they can access. In the present disclosure, an identity service for cloud computing solutions, such as Keystone for OpenStack, can communicate through APIs to a central registrar or entity to perform one or more of assigning, defining, generating, managing, maintaining, updating, deleting, etc., the IDs.

The UCCaaS 202 stores the various IDs in a database 210 can then can extract the IDs from packet in data flows, access a database 210 that stores the IDs and associated policies (on a per-service, per-tenant or even per-workload, per-subcomponent of workload basis). The UCCaaS 202 can then use the policies to define flow rules that are then delivered via an API to an OpenFlow Application 214 and Hardware/Software switches for managing data flow 216.

FIG. 2 illustrates a logical component 212 in the UCCaaS 202 that inspects the packets received from a OpenFlow enabled vSwitch 216 through an OpenFlow Application 214, detects the service-ID, tenant-ID, workload-ID, sub-workload-ID and/or other IDs and requests details such as flow-definitions and policy rules 210 that can be enforced on the switch 216. This is just an example use-case for the south-bound API interface and could be used by other applications as well. In addition to the API interfaces, the UCCaaS 202 also maintains a database 210 that stores the tenant/service/workload-IDs and any associated details such as application information, assigned policies, etc. The central database 210 stores the service/tenant/workload-IDs and correlation between the IDs as well as the policies we want to use for an ID, a pair of IDs, or three IDs. It stores the IDs, the relationship between the IDs and the policies and how they are applied. Service-IDs can be a network policy, database policy, bandwidth policy, processor policy (i.e., number of processors (real or virtual)) that are allowed to be used at one time, or characteristics of processors (i.e., does the tenant want real or virtual processor, or a particular clock speed) to be used for a particular tenant or workload. Workload-IDs can span an entire "job" or workload or can represent a subcomponent of workload, such as the data staging component which can have different policies applies than the processing component.

A tenant may want to have a first set of flow rules apply to a first workload or application and a second set of flow rules apply to a second workload or second application. The different treatment can be implemented either by a separate application ID that is assigned by a service or by the tenant or by an alternate tenant-ID such that the tenant-ID can identify the tenant and workload for that tenant. In one aspect, the fields used the assign the service-ID can have options to be able to specify or identify particular workload. Thus, the workload-ID can in one aspect but a subset of the service-ID. The service-ID is unique but a subfield in the service-ID can identify the workload-ID. In this regard, the workload-ID provide a further refining of the policies where a first job (such as a query to a database) may be identified through a workload-ID as a lower priority job and a second job from the tenant can be assigned a higher priority, with more network resources enabled, through its identification via the workload-ID. In this regards, the ID could also be used to chop up a workload into sub components and a respective subdivided component could have a different policy applied. For example, a data staging component of workload may have a separate ID to an ID associated with a processing stage of the workload.

The UCCaaS application 202 (in the application layer) performs two operations. First, it is used to manage the provider-specific service, tenant and/or workload-IDs 208 and maintains the data store 210 of the assigned IDs. The IDs are handed out by the services that are used to instantiate virtual machines and define tenants and/or workload for cloud services. Part or all of the information is then used to define policies for flows within the cloud provider's network. For example, the workload-ID and the service-ID can be utilized to define a particular policy which guides the ultimate flow rules. Any combination of a workload-ID, a service-ID and a tenant-ID can be used to develop or apply a policy. In one aspect, a workload can have a changing ID throughout its processing. For example, a workload may start out performing a data intensive portion of its work under a first ID, and then when the workload transitions to a more compute processor component of its job, then the workload can transition to another workload ID.

In one aspect, the APIs are accessible to outside of a cloud providers' environment to exchange ID specific information (service-ID related) in a secure way. Included herein is the concept of providing means for external parties to access certain information of the cloud-IDs saved within the UCCaaS 202 enables exchange of cloud-ID information across multiple cloud platforms.

In another aspect, the UCCaaS 202 can operate both legacy non-UCC enabled and newer UCC-enabled environments by making the cloud-IDs available as an overlay. Even if network elements don't support UCC-enabled operations directly in the transport, the network elements can leverage the cloud-IDs via API calls.

In yet another aspect, the UCCaaS 202 can be used to define forwarding decisions either on Layer 2 or Layer 3 devices. The UCCaaS 202 can offer south-bound API interfaces that enable interaction with network elements and allows pushing policies based on their requests. The UCCaaS 202 can maintain forwarding definitions on a per-service, per-tenant and/or per-workload basis that can be used to define L2 or L3 policies. For example, a virtual switch can forward a packet to its SDN controller (such as OpenDayLight, VTS, etc.). The controller inspects the packet to define forwarding rules. By inspecting the packet, the controller detects the UCC header and extracts the service-ID, tenant-IDs, and/or workload-IDs. Via an API call, the controller can communicate with the UCCaaS 202 to request any policies defined to the Service/Tenant/Workload-ID set. The UCCaaS 202 receives the API call and responds with previously defined policies. The policies can be define by the provider, the service, the tenant itself, or be defined as part of the workload on a predetermined basis or dynamically based on feedback from the environment. The policy can be set in part by any of the parties as well. Based on the provided policies, the OpenFlow based controller 214 in the network layer (i.e., Layer 3 of the OSI) pushes forwarding rules down through an API to the hardware switch or virtual switch 216.

The UCCaaS APIs can be used by other services such as a segment routing as a service to request policies to define the segment routing forwarding overlay (See CPOL 1003152, incorporated herein by reference). Similar to the layer 2 example previously described, the provider, the application and/or the tenant can define policies that influences automatically or based on thresholds the forwarding behavior and segment routing overlay on a per service/tenant/workload-ID set.

The UCCaaS 202 can introduce a plurality of enhancements to cloud environments wanting to use the UCC-based identifiers. While UCC itself is proposed to operate on the Network Layer of the OSI model, the UCCaaS 202 can leverage the transmitted information in a centralized way eliminating the need for every network device to requiring an understanding of the UCC. With the support of APIs to both the network devices and tenants, the provider and applications (and ideally as well to external parties), the UCC provides a way to overlay UCC information and define policies based on the IDs provided (on a per service/tenant/workload-ID basis).

Several of the benefits of the UCCaaS 202 include the ability to leverage the UCC on demand and on dynamic basis in a way that is defined by tenant, provider, workload and/or external party needs. It is an easier implementation and deployment of UCC and can include support for the UCC on legacy deployments. There are other services in a cloud providers environment can leverage UCC and its IDs to enforce policies on a per-tenant, per-service, and/or per-application basis.

Figure 3:
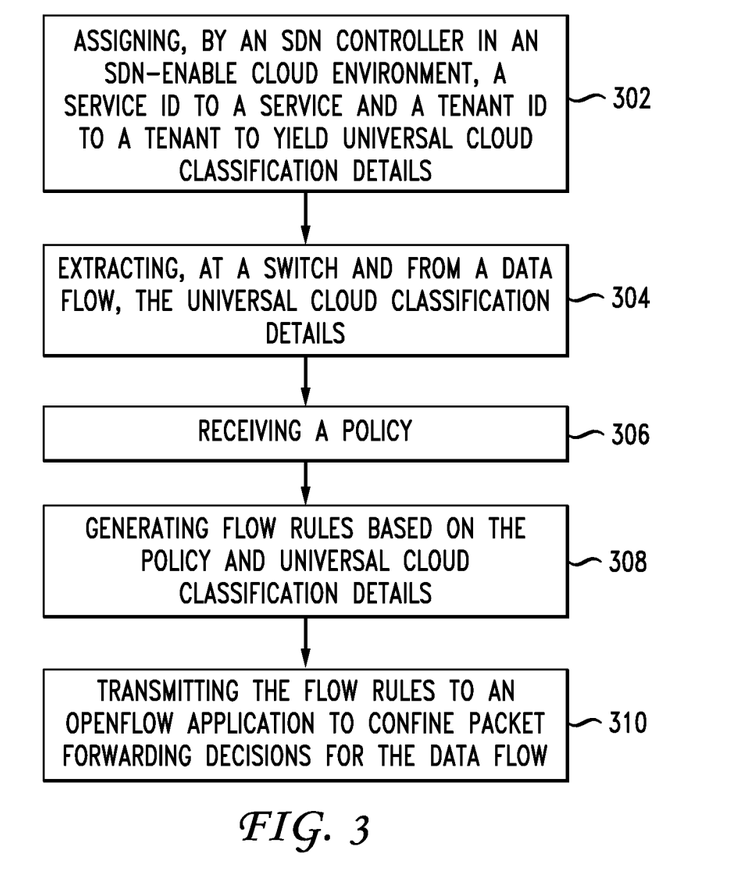
FIG. 3 illustrates an example method.

FIG. 3 illustrates a method example according to this disclosure. The method includes assigning, by a software defined network controller in a software-defined network-enable cloud environment, a service-ID to a service and/or a tenant-ID to a tenant to yield universal cloud classification details (302). As noted above, a workload-ID can also be assigned to workload or parts of workload. The method includes extracting, from a data flow, the universal cloud classification details (304) and receiving a policy (306). The policy can include one or more forwarding and routing rules, workload or tenant rules, etc.

The method includes generating flow rules based on the policy and universal cloud classification details (308) and transmitting the flow rules to an openflow application to confine packet forwarding decisions for the data flow (310). The openflow application can forward the flow rule and/or provide direction to hardware or software switches for managing the routing of packets on a per service/tenant/workload basis.

In one aspect, there can be backwards compatibility with the conventional way of managing the routing of data flows. In this regard, developing the flow rules based on policies and service/tenant/workload-IDs will be applied to manage at least a part of the overall routing of data but the standard use of IP addresses can be applied also to part of the overall routing of a data flow. The UCC IDs, for example, can be used to do the forwarding of data without completely replacing the IP addresses. In another aspect, the use of UCC IDs as disclosed herein can be used to completely replace all other routing instructions. The UCC IDs provide a much more granular approach to flow control.

In one aspect, the IDs are used in the decision making process of how to define the flow rules that apply to IP addresses or MAC addresses. For example, the component 212 in the UCCaaS determines that a particular packet has a service-ID and a particular tenant-ID, and based on the IDs, identifies a policy which directs how the network should route or switch the flow containing the pack along a certain path.

One or more of the service-ID, the tenant-ID and the workload-ID are stored in a database and used for the various purchases set forth herein. The method can include storing in a header or other field of a packet in a packet flow one or more of the service-ID, the tenant-ID and the workload-ID. The flow rules can be generated or defined without direct understanding of the service-ID, the tenant-ID or the workload-ID. The policy can be predetermined and selected based on one or more of the service-ID, the tenant-ID, and the workload-ID. Or, they policy can be dynamic and generated as needed based on one or more of the service-ID, the tenant-ID, and the workload-ID. External data can be utilized as well for choosing or generating the policy. Thus, the policy can be defined on one of a per service-ID basis, per tenant-ID basis, per workload-ID basis, or some other basis such as external data. The extracting of the universal cloud classification details can be performed at an openflow application or a UCCaaS component. A controller module in the software-defined network-enable cloud environment, or some other component, can assign the service-ID to the service, the tenant-ID to the tenant and/or the workload-ID to the workload of the tenant. When the workload-ID is assigned, the universal cloud classification details can include the service-ID, the tenant-ID and the workload-ID, as well as any other external data. The method can further include generating the flow rules based on the universal cloud classification details.

The present examples are to be considered as illustrative and not restrictive, and the examples is not to be limited to the details given herein, but may be modified within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   assigning, by a controller in a cloud service provider network, one or more identifiers to yield cloud identification information;
   extracting, from a data flow, the cloud identification information;
   generating one or more policies based on the cloud identification information, wherein the one or more policies are defined without device inspection to obtain a direct understanding of the one or more identifiers; and
   transmitting the one or more policies to an application to conform packet handling of the data flow.

2. The method of claim 1, further comprising:
storing the one or more identifiers,
wherein the one or more identifiers include at least one of a service identifier or a tenant identifier.

3. The method of claim 1, wherein the cloud identification information includes universal cloud classification details stored in a header of a packet in the data flow.

4. The method of claim 1, wherein the one or more policies include flow rules defined using a 5-tuple classification.

5. The method of claim 1, wherein the one or more policies include flow rules defined without direct understanding of a service identifier.

6. The method of claim 1, wherein the controller communicates via an application programming interface.

7. The method of claim 1, further comprising:
generating the one or more policies based on the cloud identification information and a received policy,
wherein the received policy is based on at least one of a service identifier or a tenant identifier.

8. The method of claim 1, further comprising:
generating the one or more policies based on the cloud identification information and a received policy,
wherein the received policy is defined on a per service identifier basis or a per tenant identifier basis.

9. The method of claim 1, wherein the cloud identification information is extracted by a software-defined network controller service.

10. The method of claim 1, further comprising:
assigning a service identifier to a service and a tenant identifier to a tenant.

11. The method of claim 1, further comprising:
assigning a workload identifier to workload of a tenant,
wherein the cloud identification information includes a service identifier, a tenant identifier, and the workload identifier.

12. The method of claim 11, further comprising:
generating the one or more policies based on universal cloud classification details.

13. A system comprising:
one or more processors; and
a computer-readable medium, storing instructions which, when executed by the one or more processors, cause the one or more processors to perform operations comprising:
assigning, by a controller in a cloud service provider network, one or more identifiers to yield cloud identification information;
extracting, from a data flow, the cloud identification information;
generating one or more policies based on the cloud identification information, the one or more policies defined without device inspection to obtain a direct understanding of the one or more identifiers; and
transmitting the one or more policies to an application to conform packet handling of the data flow.

14. The system of claim 13, wherein the one or more policies include flow rules defined using a 5-tuple classification.

15. The system of claim 13, wherein the cloud identification information includes universal cloud classification details stored in a header of a packet in the data flow.

16. The system of claim 13, wherein the controller communicates via an application programming interface.

17. The system of claim 13, wherein the one or more policies are generated based on the cloud identification information and a received policy, and the received policy is based on at least one of a service identifier or a tenant identifier.

18. The system of claim 13, wherein the one or more policies are generated based on the cloud identification information and a received policy, and the received policy is defined on a per service identifier basis or a per tenant identifier basis.

19. The system of claim 13, wherein the one or more identifiers include at least one workload identifier assigned to a workload of a tenant, and the cloud identification information includes a service identifier, a tenant identifier, and the at least one workload identifier.

20. A computer-readable storage device storing instructions via a non-transitory storage medium which, when executed by a processor, cause the processor to perform operations comprising:
assigning, by a controller in a cloud environment, one or more identifier to yield cloud identification information;
extracting, from a data flow, the cloud identification information;
generating one or more policies based on the cloud identification information, the one or more policies defined without device inspection to obtain a direct understanding of the one or more identifiers; and
transmitting the one or more policies to an application to conform packet handling of the data flow.

* * * * *